United States Patent [19]
DuNah et al.

[11] Patent Number: 5,400,224
[45] Date of Patent: Mar. 21, 1995

[54] LIGHTING PANEL

[75] Inventors: Richard E. DuNah; William F. Redmond, both of Sonoma County, Calif.

[73] Assignee: Precision Lamp, Inc., Cotati, Calif.

[21] Appl. No.: 213,384

[22] Filed: Mar. 15, 1994

Related U.S. Application Data

[63] Continuation of Ser. No. 2,404, Jan. 8, 1993, abandoned.

[51] Int. Cl.⁶ ............................................. F21V 7/04
[52] U.S. Cl. ...................................... 362/31; 362/32; 385/901
[58] Field of Search .......................... 362/26, 31, 32; 385/901

[56] References Cited

U.S. PATENT DOCUMENTS

| | | | |
|---|---|---|---|
| 4,733,332 | 3/1988 | Yamashita et al. | 362/32 |
| 4,791,540 | 12/1988 | Dreyer, Jr. et al. | 362/31 |
| 4,901,207 | 2/1990 | Sato et al. | 362/32 |
| 5,005,108 | 4/1991 | Pristash et al. | 362/31 |
| 5,036,435 | 7/1991 | Tokuda et al. | 362/31 |
| 5,050,946 | 9/1991 | Hathaway et al. | 362/31 |
| 5,070,431 | 12/1991 | Kitazawa et al. | 362/26 |
| 5,079,675 | 1/1992 | Nakayama | 362/26 |
| 5,093,765 | 3/1992 | Kashima et al. | 362/31 |
| 5,136,480 | 8/1992 | Pritash et al. | 362/31 |
| 5,227,773 | 7/1993 | Wu et al. | 362/31 |
| 5,233,679 | 8/1993 | Oyama | 385/901 |

FOREIGN PATENT DOCUMENTS 0465376 8/1951 Italy ........................................ 362/31

*Primary Examiner*—Richard A. Bertsch
*Assistant Examiner*—M. Kocharov
*Attorney, Agent, or Firm*—Flehr Hohbach Test Albritton & Herbert

[57] ABSTRACT

A lighting panel having a polished major surface and a shaped major surface opposite the first major surface. The shaped major surface has a plurality of longitudinally extending grooves shaped to define, with the first major surface and sides, a plurality of light guides extending from the light receiving end. The light guides have polished hill portions for internally reflecting light striking the polished hill portions and transmitting light along the guides and the grooves having roughened valley portions for causing a portion of the light transmitted along the guides to project outwardly from the major surfaces with the light emitted from the roughened valley portions of the grooves having a uniform distribution across the panel.

10 Claims, 6 Drawing Sheets

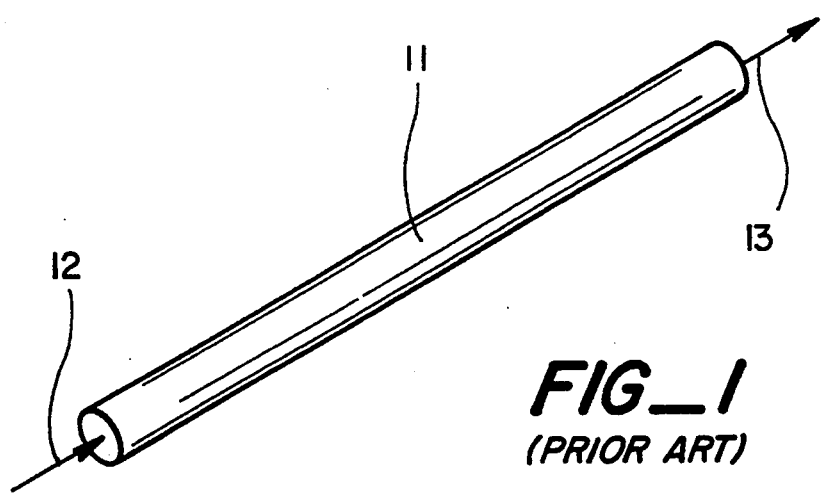
FIG_1 (PRIOR ART)
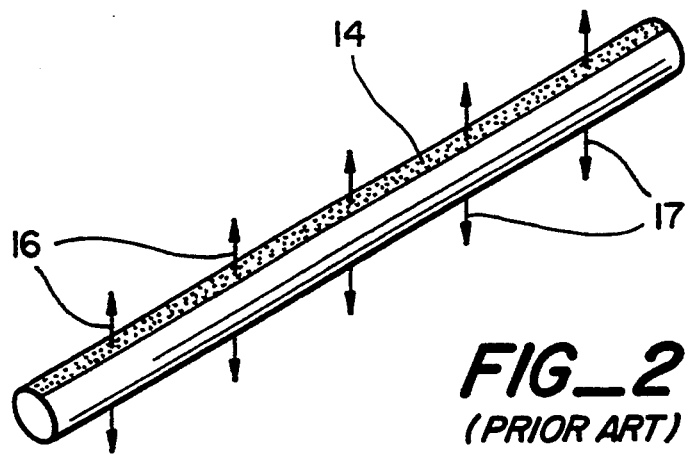
FIG_2 (PRIOR ART)
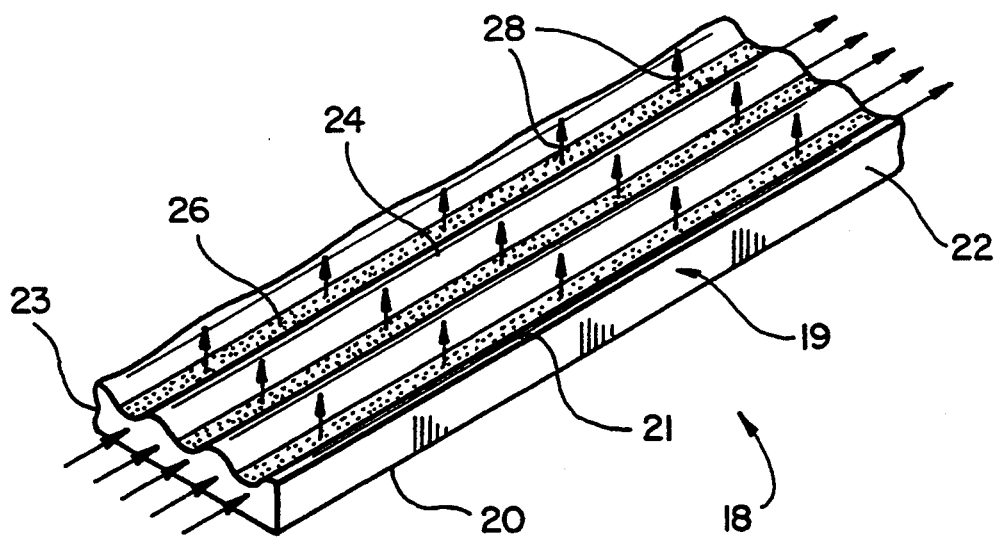
FIG_3

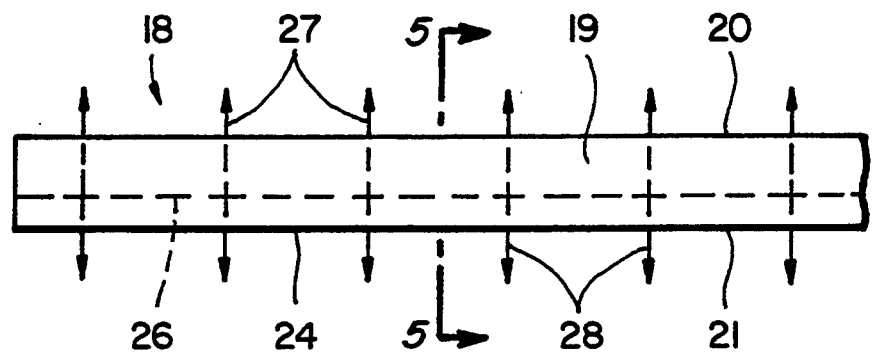
FIG_4
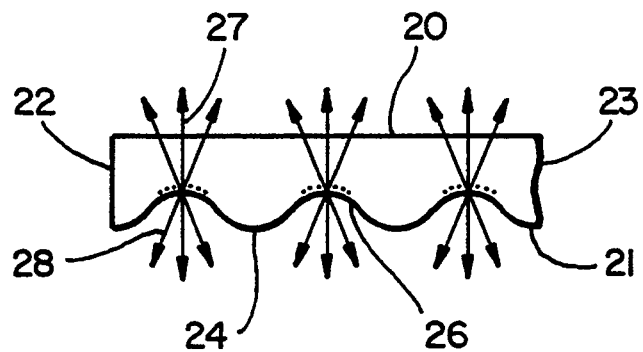
FIG_5
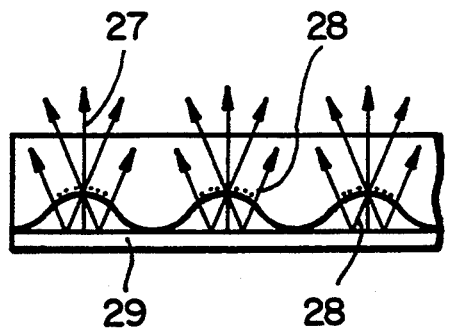
FIG_6

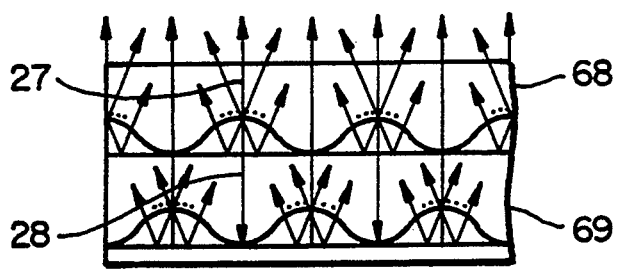
FIG_7
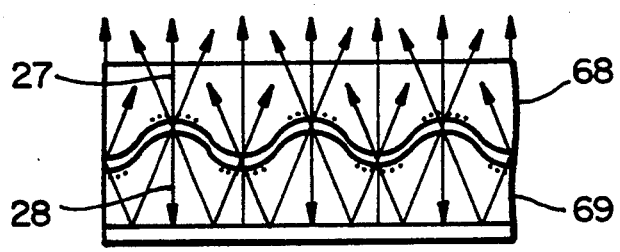
FIG_8
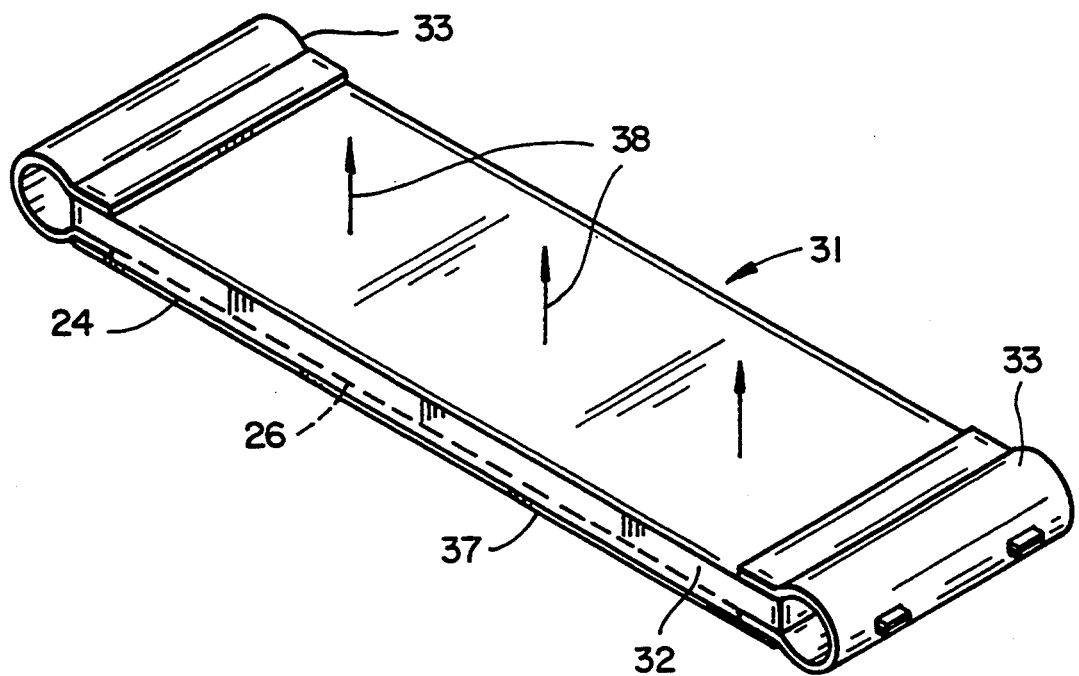
FIG_9

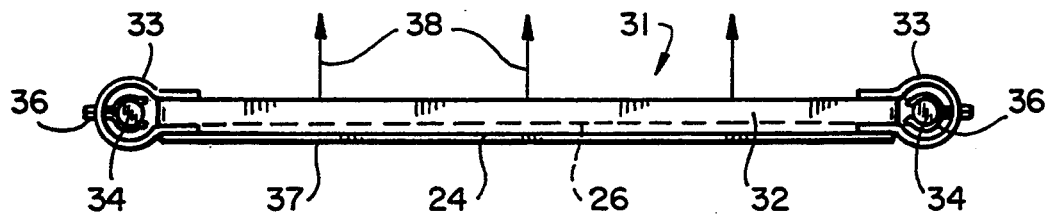
FIG_10
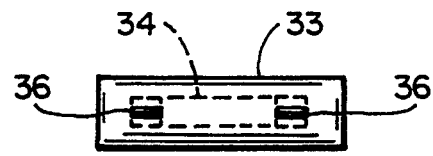
FIG_11
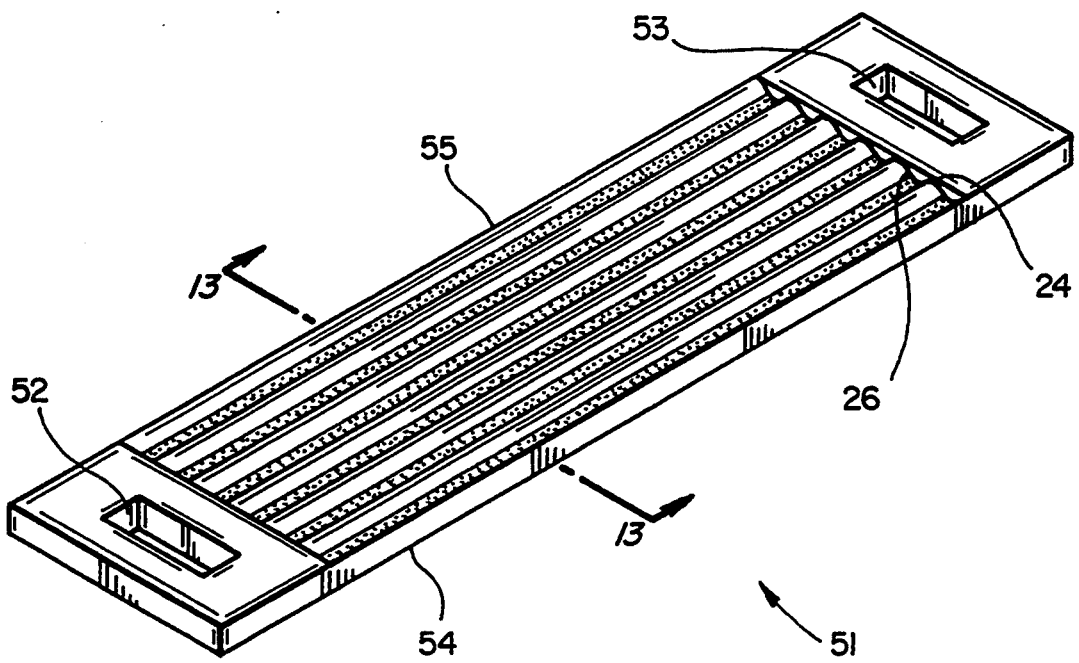
FIG_12

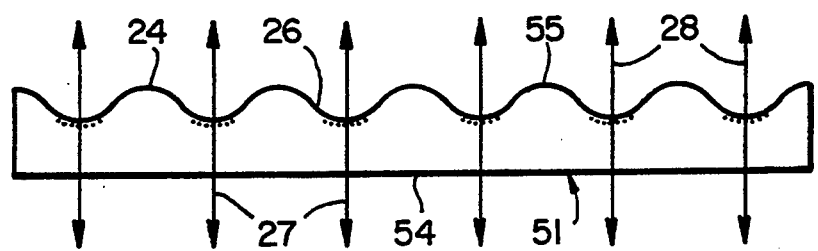
FIG_13
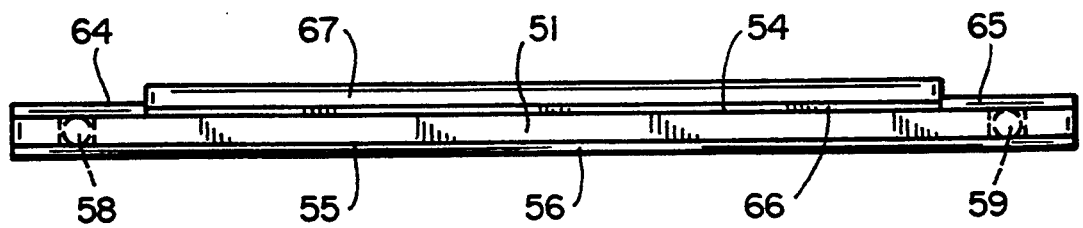
FIG_14
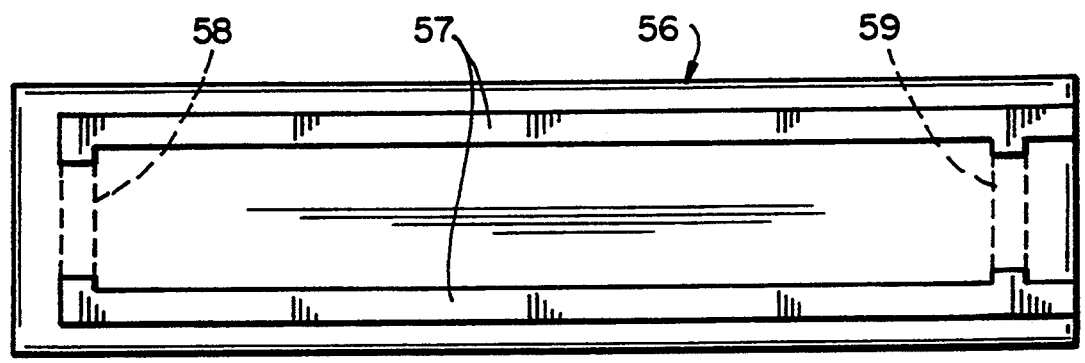
FIG_15

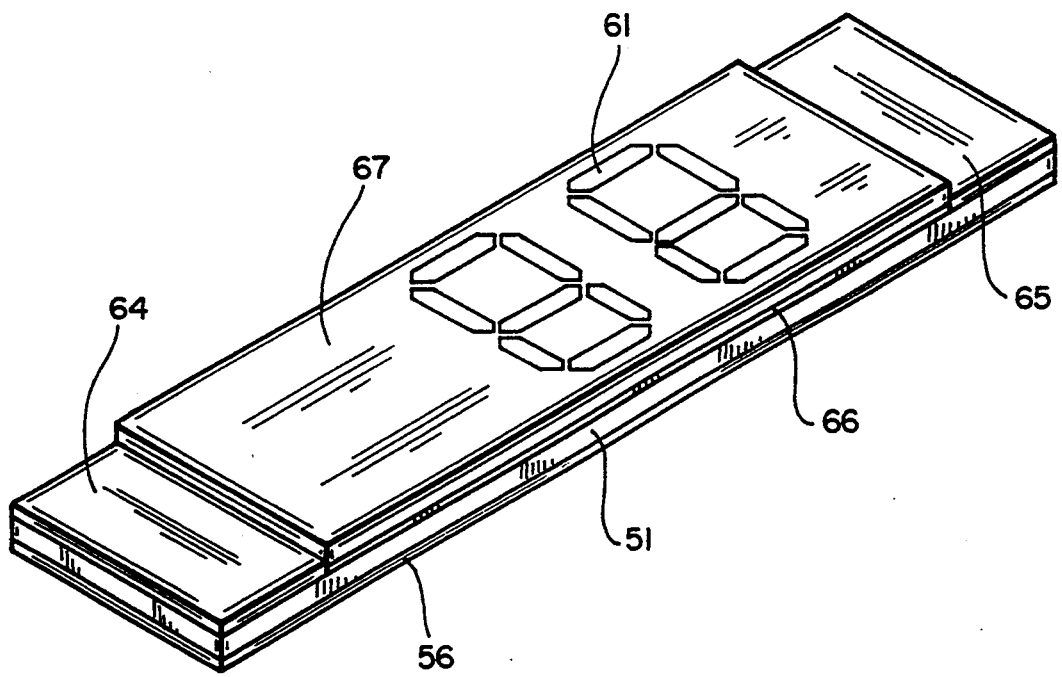
FIG_16
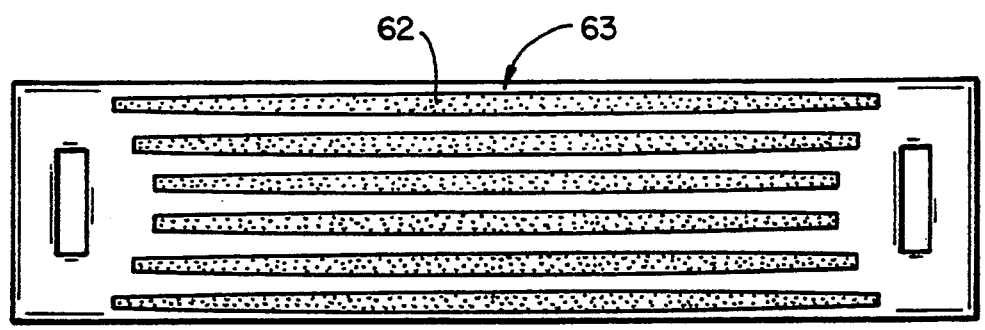
FIG_17

LIGHTING PANEL

This is a continuation of application Ser. No. 08/002,404, filed Jan. 8, 1993, now abandoned.

BRIEF DESCRIPTION OF THE INVENTION

This invention relates generally to a lighting panel and more particularly to a lighting panel employing integral light guides and light sources.

BACKGROUND OF THE INVENTION

There are many applications where it is necessary to provide a large area light source. An example is the illumination of liquid crystal displays such as are found in watches, clocks, cellular telephones, pagers, etc., so that they can be easily read in low ambient light environments. At present, such displays are illuminated with one or more miniature lamps which radiate light. In such displays, the light non-uniformly illuminates the display, making portions of the display dimmer and harder to read than others.

OBJECTS AND SUMMARY OF THE INVENTION

It is a general object of this invention to provide an improved uniformly lit surface for back-lighting and/or projection lighting.

It is another object of the invention to provide an improved surface lighting assembly which may include an integrally assembled light source.

It is another object of the invention to provide a low-cost, uniformly lit surface for back-lighting and/or projection lighting fabricated by molding, extrusion, hot stamping or machining.

It is another object of the invention to provide a lighting panel which includes a plurality of integrally formed light guides having a partially toughened or abraded surface.

It is another object of the invention to provide a lighting assembly employing a plurality of lighting panels in accordance with this invention.

The foregoing and other objects of the invention are achieved by a one-piece, flat, transparent panel having polished sides, a first flat, polished major surface and a shaped second major surface opposite the first major surface. The second major surface is shaped to define with the first major surface and sides a plurality of elongated light guides with polished portions for transmitting light from one end of the light guide to the other and toughened portions for causing light to project outwardly from the major surfaces.

BRIEF DESCRIPTION OF THE DRAWINGS

The foregoing and other objects of the invention will be more clearly understood from the following description when read in conjunction with the attached drawings, of which:

FIG. 1 shows a light pipe in accordance with the prior art;

FIG. 2 shows a light pipe in accordance with the prior art having an abraded portion permitting light to escape from the light pipe;

FIG. 3 shows an enlarged portion of a lighting panel in accordance with the invention;

FIG. 4 is a side elevational view of the lighting panel shown in FIG. 3;

FIG. 5 is a sectional view of the panel taken along the line 5—5 of FIG. 4;

FIG. 6 shows the lighting panel of FIG. 5 disposed on a diffuse reflector;

FIG. 7 shows two superposed lighting panels;

FIG. 8 shows another arrangement of superposed lighting panels;

FIG. 9 shows the lighting panel of FIGS. 3, 4, 5 and 6 incorporated in a display panel assembly;

FIG. 10 is a side elevational view of the lighting panel assembly of FIG. 9;

FIG. 11 is an end view of the lighting panel assembly of FIG. 9 showing the electrical connections;

FIG. 12 shows another lighting panel in accordance with the invention;

FIG. 13 is a sectional view taken along the line 13—13 of FIG. 12;

FIG. 14 is a side elevational view of a display assembly incorporating the panel of FIGS. 12 and 13;

FIG. 15 is a bottom view of the electrical connections to the lights in the assembly of FIG. 13;

FIG. 16 shows a liquid crystal display assembly back-lighted with a lighting panel in accordance with the embodiment of FIG. 14;

FIG. 17 shows a lighting panel in accordance with a further feature of the invention.

DESCRIPTION OF PREFERRED EMBODIMENT

In FIG. 1 there is shown a prior art light pipe 11. Light 12 enters one end of the light transmissive light pipe and exits the other end 13 with a minor amount of light lost within the rod. The mechanism of light transmission within the rod is by multiple reflection at less than critical angle. Other cross-section shapes of light pipes may be used, such as rectangular, triangular, elliptical, irregular, etc. A high length to cross-section ratio of the light guide is desirable.

Referring to FIG. 2, a surface portion 14 of the light pipe is toughened by abrasion or texturing. Light strikes this portion at greater than critical angle and exits the side of the rod at the roughened surface as shown by arrows 16, and is reflected through the rod and exits from the opposite polished surface where it strikes the walls at greater than the critical angle, as shown by arrows 17. The light is shown by a single arrow; however, it is to be understood that the light is emitted at numerous angles in a substantially hemispherical pattern.

FIG. 3 shows a portion of a light panel 18 in accordance with the invention. The light panel 18 includes a transparent body 19 having a polished major surface 20 and an opposite shaped major surface 21. The surface 21 of the panel includes hills and valleys 24, 26 which may be formed by molding, hot-stamping, machining or extruding the panel. The sides 22 and 23 are also polished. The hills 24 and valleys 26, FIGS. 4 and 5, cooperate with the lower major surface 20 to define a plurality of interconnected parallel light guides. The hills 24 are polished while the valleys 26 are toughened as by abrading or texturing. Thus, as light is transmitted down the guides, it diffuses outwardly from the panel from both of the major surfaces 20 and 21 as shown by the arrows 27, 28 along the abraded or toughened regions. It should be apparent that the light guides can be formed in other configurations such as with flat hills and valleys, defining interconnected elongated light guides.

Referring to FIG. 5, it is seen that the light projects away from the roughened surface in all directions 27, 28 providing substantially uniform emission from the two surfaces. In accordance with this invention, a diffuse white surface 29, FIG. 6, is provided in contact with the hills and serves to reflect the impinging light 28 back into and through the panel where it combines with directly emitted light 27. This further helps in providing substantially uniform illumination. Two panels 68, 69 may be overlaid and offset as shown in FIGS. 7 and 8 to further contribute to uniform illumination. It is to be realized that only a few hills and valleys are shown. In actual practice there are a large number of such hills and valleys. The panel may be as thin as 0.01 inches or less with the hills and valleys being 0.020 inches or less apart.

A panel of the type described may be incorporated in an illuminating assembly of the type shown in FIGS. 9–11. The assembly 31 includes a panel 32, FIG. 9, of the type shown in FIG. 3 and including hills and valleys 24, 26 on one major surface and polished sides, ends and the other major surface. A lamp housing 33 engages the end of panel 32. The lamp housing supports a lamp 34. The housing may be a molded plastic housing with the inner or outer surfaces provided with a reflecting film or surface. The housing 33 is shaped to concentrate light from the lamp into the end of the panel. For example, the shape may be parabolic or elliptical. Clips 36 engage the ends of the lamp and not only support the lamp in the housing, but also provide electrical connections to the ends of the lamp. The lamp may be a lamp such as described in U.S. Pat. No. 4,952,838. It is apparent that the light may be supplied by light emitting diodes, cold cathode lamps or other light sources. Further, the light may be conveyed to or focused onto the end surface by fiber optic bundles or lens. A flat white diffuse reflecting member 37 lies on top of the hills 24. A reflecting film, not shown, may overlie the reflecting member 37 and extend up the sides of the panel. Light from the lamp travels down the panel and is emitted from the upper panel face as described with reference to FIGS. 5 and 6. A typical assembly may be in the order of 0.040" thick with the housing 0.080" high. When the lamps at each end are energized, the light is emitted substantially uniform in all directions from the upper surface as schematically shown by arrows 38, FIGS. 9, 10. The panel may then be employed to illuminate an associated liquid crystal display or the like.

In another embodiment, FIG. 12, a panel 51 includes a pair of openings 52, 53 which can accommodate a suitable light source such as an incandescent lamp or light emitting diode. The light from the light source enters the panel and is transmitted along the length of the light guides. Light projects outwardly from the panel along the roughened regions as shown in FIG. 13. If the intensity of projected light is not of uniform intensity along the panel, the roughened areas may be tapered, as shown in FIG. 17, whereby to maintain uniform light flux along the light guides.

By placing a diffuse reflecting surface 56 on the shaped surface 55, light is reflected back toward the surface 54 whereby it adds to the light from the abraded surface. FIG. 14 shows such a diffuse reflecting surface 56. The reflecting surface is white to project white light. However, by changing the color of the reflecting surface, the color of the projected light can be selected. The white surface or backup surface includes thin leads 57, FIG. 15, which can be connected to a light source 58, 59 disposed in the openings 52, 53.

The projecting light panel is particularly suitable for back-lighting liquid crystal displays. Referring to FIGS. 14 and 16, a liquid crystal display 67 is placed on the polished major surface 54 of panel 51. A light source is placed in the openings 52, 53 and covered with opaque covers 64, 65. The reflecting surface 56 is placed on the shaped surface 55 and electrical connection made to the light sources. Light projects into the back of the liquid crystal display where it is diffused and illuminates the panel to display the segmented lettering or numerals 61. A thin, light diffusing layer of material 66 may be placed between the light panel 51 (surface 54) and the liquid crystal display 67. The purpose of this layer is to improve the uniformity of light emitted across the surface 54.

In FIG. 17, there is shown a light panel in which the shaped surface is formed to increase the size of the abraded portion 62 toward the center 63 to increase the projecting light to compensate for the reduction of light intensity in the light guide as light projects outwardly along the guide. Alternatively, the size of the guides may be reduced to provide uniform light flux density along the guides.

There has been provided an inexpensive, easy-to-manufacture lighting panel which projects an area of substantially uniform light for back-lighting or front-lighting liquid crystal displays and the like.

What is claimed is:

1. A lighting panel comprising a transparent member having polished sides, at least one light receiving end, a first flap polished major surface and a second shaped major surface opposite said first major surface, said second major having a plurality of longitudinally extending grooves shaped to define, with the first major surface and sides, a plurality of light guides extending from said light receiving end, said light guides having polished hill portions for internally reflecting light striking said polished hill portions and transmitting light along the guides and said grooves having roughened valley portions for causing a portion of the light transmitted along said guides to project outwardly from said major surfaces with the light emitted from said roughened valley portions of said grooves having a uniform distribution across said panel.

2. A lighting panel as in claim 1 including a diffused reflecting sheet overlying said second major surface, serving to reflect light projecting from said second major surface back through the transparent member to project from the first major surface.

3. A lighting panel as in claim 2 including additionally a liquid crystal display carried by said first major surface to be back-lighted by said lighting panel.

4. A lighting panel as in claim 3 including a light diffusing panel between said first major surface and said liquid crystal display.

5. A lighting panel as in claims 1 or 2 including means for supplying light to at least one end of said light guides.

6. A lighting panel as in claims 1 or 2 including a light source disposed at opposite ends of said light guides to supply light to the ends of said light guide for transmission therealong.

7. A lighting assembly including superposed first and second transparent members, each having polished sides, at least one light receiving end, a first flat polished major surface and a second shaped major surface opposite said first major surface, said second major surface having a plurality of longitudinally extending grooves shaped to define with the first major surface and sides, a plurality of light guides extending from said light receiving end, said light guides having polished hill portions for internally reflecting light striking said polished hill portions and transmitting light along the guides and said grooves having roughened valley portions for causing light transmitted along the guides to project outwardly from the major surfaces with the light emitted from said roughened valley portions of said grooves having a uniform distribution across said panel, said first and second transparent members being offset with respect to one another whereby said polished hill portions of said light guides and said roughened valley portions of said grooves overlie one another.

8. A lighting assembly as in claim 7 including light reflecting means adjacent to the outer major surface of one of said panels to reflect light projecting from said outer major surface back through said panels to the outer major surface of the other panel to project from said outer major surface of said other panel.

9. A lighting assembly as in claim 8 including additionally a liquid crystal display carried by said outer major surface of said other panel to be back-lighted by said lighting assembly.

10. A lighting assembly as in claim 9 including a light diffusing layer between said liquid crystal display and said outer major surface of said other panel.

* * * * *